United States Patent
Ossipov et al.

(10) Patent No.: US 9,306,854 B2
(45) Date of Patent: Apr. 5, 2016

(54) METHOD AND APPARATUS FOR DIAGNOSING INTERFACE OVERSUBSCRIPTION AND MICROBURSTS

(71) Applicant: Cisco Technology, Inc., San Jose, CA (US)

(72) Inventors: Andrew E. Ossipov, Santa Clara, CA (US); David Cherkus, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 410 days.

(21) Appl. No.: 13/778,339

(22) Filed: Feb. 27, 2013

(65) Prior Publication Data

US 2014/0241151 A1      Aug. 28, 2014

(51) Int. Cl.
*H04L 12/26* (2006.01)
*H04L 12/801* (2013.01)

(52) U.S. Cl.
CPC ..................................... *H04L 47/12* (2013.01)

(58) Field of Classification Search
None
See application file for complete search history.

(56) References Cited

U.S. PATENT DOCUMENTS

| | | | | |
|---|---|---|---|---|
| 5,412,801 A | * | 5/1995 | de Remer | G06F 12/16 707/999.01 |
| 6,122,279 A | * | 9/2000 | Milway et al. | 370/395.32 |
| 6,678,244 B1 | * | 1/2004 | Appanna et al. | 370/229 |
| 6,728,212 B1 | * | 4/2004 | Tancevski | 370/235 |
| 6,934,256 B1 | * | 8/2005 | Jacobson et al. | 370/235 |
| 8,312,188 B1 | * | 11/2012 | White et al. | 710/56 |
| 2004/0153854 A1 | * | 8/2004 | Agrawal et al. | 714/43 |
| 2005/0063320 A1 | * | 3/2005 | Klotz et al. | 370/254 |
| 2012/0051216 A1 | * | 3/2012 | Zhang et al. | 370/230 |

* cited by examiner

*Primary Examiner* — Dang Ton
*Assistant Examiner* — Ronald H Davis
(74) *Attorney, Agent, or Firm* — Merchant & Gould P.C.

(57) ABSTRACT

A methodology is described for providing a dedicated interface-level oversubscription diagnostics queue that would store header data and timestamps for ingress frames which would otherwise be dropped due to the input FIFO queue being full. When the microburst is over, the data may be transmitted to the main CPU to analyze the cause of oversubscription as well as affected traffic.

20 Claims, 4 Drawing Sheets

METHOD AND APPARATUS FOR DIAGNOSING INTERFACE OVERSUBSCRIPTION AND MICROBURSTS

BACKGROUND

Traditional approaches to troubleshooting interface oversubscription currently utilized by clients and technical support providers involve connecting an external packet sniffer to analyze the ingress traffic on any device that uses Ethernet controllers showing overrun errors. Such an approach creates a number of challenges.

One problem with traditional approaches is that they are inefficient. It takes time to connect proper hardware after experiencing overrun errors on a particular interface once and then waiting to determine if the problem repeats itself. Depending on the frequency of problem occurrence, packet captures may be collected for an extended period of time, which in some cases may not even be operational possible. As it may be impossible to identify the timestamps in a given microburst, large amounts of effort are required to analyze any corresponding captures.

Furthermore, the ability to capture a microburst may depend on the capabilities of packet sniffer hardware. Since many network devices are based on similar general-purpose network interface cards, similar limitation with respect to handling interface oversubscription apply as well.

Even if the capture is collected successfully at the ingress of a particular network device, a corresponding capture at all of the egress points would still be required to determine what specific traffic was dropped. It becomes even more challenging with the implementation of firewalls and other security devices as some traffic may be dropped for security reasons and not due to oversubscription. In other words, there is no straightforward way to identify specific traffic that was dropped due to exceeding available FIFO queue space at the ingress interface.

BRIEF DESCRIPTION OF THE DRAWINGS

The accompanying drawings, which are incorporated in and constitute a part of this disclosure, illustrate various embodiments. In the drawings.

DETAILED DESCRIPTION OF EXAMPLE EMBODIMENTS

Overview

Figure 1:
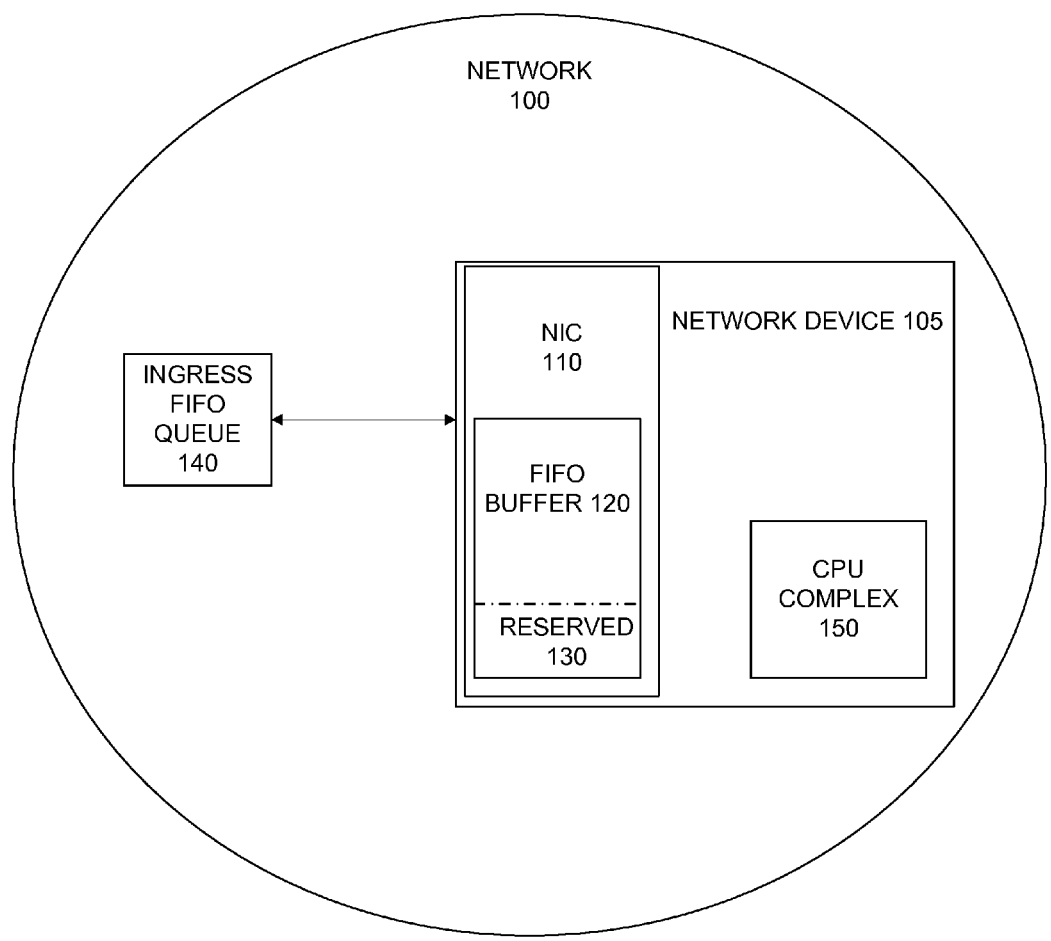
FIG. 1 illustrates an example network environment for embodiments of this disclosure.

Consistent with embodiments of the present disclosure, systems and methods are disclosed for providing a dedicated interface-level oversubscription diagnostics queue that would store header data and timestamps for ingress frames which would otherwise be dropped due to the input FIFO queue being full. When the microburst is over, the data may be transmitted to the main CPU to analyze the cause of oversubscription as well as affected traffic.

In some embodiments, a method of diagnosing data microbursts may be provided comprising: reserving a portion of a FIFO buffer; setting a first bit when an ingress FIFO queue is full; receiving a first frame that cannot be accommodated by the ingress FIFO queue; storing a reduced version of the first frame in the FIFO buffer; and attaching a timestamp associated with the receipt of the first frame to the reduced version of the first frame. It should be understood that a vendor may choose to implement a second buffer for diagnostics instead of reserving a portion of an existing buffer.

In some embodiments, a method of diagnosing data microbursts may be provided comprising: reserving a portion of a queue associated with a network interface card; storing information during a microburst about frames dropped at an ingress queue in the reserved portion, wherein the stored information comprises data from each frame and a timestamp associated with each frame; and transmitting the stored information upon completion of the microburst. The information may be transmitted to a CPU complex for further processing.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and substituting, reordering, or adding stages to the disclosed methods may modify the methods described herein. Accordingly, the following detailed description does not limit the disclosure. Instead, the proper scope of the disclosure is defined by the appended claims.

With the modern advances in general purpose CPU performance, the architecture of many network devices is no longer based around custom application specific integrated circuits ("ASICs") and hardware forwarding. Off-the-shelf components may allow for the creation of very flexible and scalable architectures with minimal vendor-specific tweaks (typically, at the firmware level). Such an approach works well for devices that require an in-depth processing and inspection of transit traffic, which may be difficult to accelerate in hardware.

A prime example may be a firewall appliance where all packets may be processed in software by a complex of general purpose CPUs. At the entrance to the CPU complex, off-the-shelf Ethernet network interface cards may move packets to and from the "transmission wire" and in and out of the main memory with no CPU involvement (also known as a Direct Memory Access ("DMA") mechanism).

Such architectures may be very susceptible to frame microbursts where the interface input FIFO queue reaches capacity while the DMA mechanism is still in the process of transferring previously received data. When a new frame arrives with no available space in the FIFO queue, such a frame may be dropped (commonly known as an "overrun" error). No information may be retained about a frame dropped in this fashion.

When troubleshooting an interface oversubscription issue, it is imperative to know what packets are being dropped. For one, it may be important to identify the specific application that is affected. Also, it is beneficial in detecting anomalies in the traffic profile.

Embodiments of the present disclosure propose a mechanism to reserve a portion of the network interface card FIFO queue space to retain information about frames that were dropped due to ingress FIFO queue overflow ("overrun error"). Included in this information may also be timing information for the dropping of the packets. The collected data may later be analyzed by the general-purpose CPU complex. Existing network interface card hardware may have a portion of the FIFO buffer already reserved for future applications (such as virtualization). This pre-reserved FIFO space may be used for information storage.

Even when tapping into the currently used FIFO buffers, the system impact should be minimal. For example, during testing of embodiments of the present disclosure, DMA engine performance saturation was found to start with about 128 KB of the total 512 KB FIFO space filled up in a 10 gigabit Ethernet switch device. As such, a small portion of the total FIFO space (for example, 64 KB from the ingress and egress buffers) may be set aside for collecting information about dropped frames as well as the timing of microbursts of data.

A first approach to accomplish the described information collection may be implemented in a network interface card. The network interface card may simply truncate the frame to the first 40-60 bytes before attaching an internal timestamp and storing the truncated frame in a special FIFO queue. The number of frame bytes may be dependent on system requirements. It may be useful to obtain Ethernet, IPv4, or IPv6 information along with the first bytes of the transport protocol header. As little as 64 KB of reserved queue space (compared to 512 KB total ingress FIFO queue sizes currently available on many network device controllers) may allow for the storage of 1000-1400 truncated packets (depending upon the IP protocol) during a given microburst. This first approach may involve minimal effort from the network interface card.

A second approach to accomplish the described information collection may alternatively be implemented in a network interface card. The network interface card may extract the MAC and IP addresses as well as the transport ports. This information may then be stored in the reserved FIFO space in a predefined format. Since may network interface cards already perform internal load-balancing decisions based on at least part of this information, the information may be extracted without adding additional mechanisms to existing equipment. Such an approach would allow for much higher data density than the first approach, but may require more processing power.

Once the microburst of data is completed, the truncated packets may be transmitted to the CPU complex along with the internal timestamp for additional processing. The general purpose CPU may store the statistics internally or offload the statistics to an external network management system for archival. The external network management system may also perform time-based analysis on the statistics. This information allows a user the opportunity to identify the frequency and duration of microbursts, affected traffic, and identification of offending packets.

An advantage of embodiments of the present disclosure is that it does not require any external equipment to troubleshoot interface oversubscription events. Since monitoring is happening constantly at the network interface card level, data may be captured on the first occurrence and the events may be timestamped with a high level of precision. Furthermore, frames dropped due to oversubscription may be specifically identified, as opposed to other reasons (such as firewall policy drops).

While there exists a possibility of the oversubscription diagnostics queue filling up during severe microbursts, the diagnostics queue may still retain a significant amount of stored information about the dropped frames. This partial information may still be further analyzed by the main CPU and effective corrective action may be taken. In some embodiments of the present disclosure, corrective action may include user notification, queue resizing, and other appropriate activities.

Referring to FIG. 1, an example of a network 100 in which embodiments described herein may be implemented is shown. The embodiments described herein may operate in the context of a data communication network including multiple network devices. Some of the devices in the network may be routing bridges, switches, bridges, routers, gateways, or other network devices. In some embodiments, the network device is implemented on a general purpose machine as described below with respect to FIG. 4.

In embodiments of the present disclosure, it may be desired to initialize an Ethernet interface, such as a network interface card 110. Network interface card 110 may reserve a certain portion of its FIFO buffer space 120 for an oversubscription diagnostics queue 130. When an ingress FIFO queue 140 is determined to be full and a new incoming frame may not be accommodated, a "microburst" bit may be set to indicate a beginning of an oversubscription event. The current timestamp may then be added to the event. The event timestamp information may then be stored at the tail of oversubscription diagnostics queue 130.

The received frame may then be moved to the tail of oversubscription diagnostics queue 130. While in oversubscription diagnostics queue 130, the received frame may have its relevant protocol fields extracted. Such protocol fields may include, but are not limited to: VLAN information, MAC addresses, IP addresses, and TCP/UDP ports. Alternatively, the received frame may be truncated to a predetermined size in order to preserve the protocol headers as discussed above. In either case the event timestamp information may be attached to the resulting frame. This frame may then be stored in oversubscription diagnostics queue 130.

When oversubscription diagnostics queue 130 is nearly full, an event may be stored at the tail of oversubscription diagnostics queue 130 with a timestamp indicating the end of diagnostic information storage. Network interface card 110 may keep a count of frames that could not be accommodated into oversubscription diagnostics queue 130 beyond the end of diagnostic information storage. Network interface card 110 may store other associated information such as an average dropped frame size. A CPU complex 150 may retrieve this associated information at a later time.

In some embodiments of the present disclosure, the original ingress frame may be dropped along with its associated header information. This may be beneficial when CPU complex 150 is only interested about the start of the oversubscription event. In other cases, it may be beneficial to obtain the most recent packets that could not be accommodated by ingress FIFO queue 140. In such an example, oversubscription diagnostics queue 130 may perform a head-drop to accommodate the most recent incoming frame header data. CPU complex 150 may set a flag in network interface card 110 which indicates which of the above approaches to use when handling the original ingress frame.

Network interface card 110 may continue to move frames from oversubscription diagnostics queue 130 into the main memory similar to how other ingress packets are moved, but with a lower priority. CPU complex 150 may recognize the frames and correlate the data and subsequently inform an end user and make other internal decisions.

Later, a subsequent data frame may be received when ingress FIFO queue 140 has newly available space. The "microburst" bit may be reset at this time. In some embodiments of the present disclosure, a timestamped event may be queued to oversubscription diagnostics queue 130. This timestamped event may signify the end of the current microburst.

Figure 2:
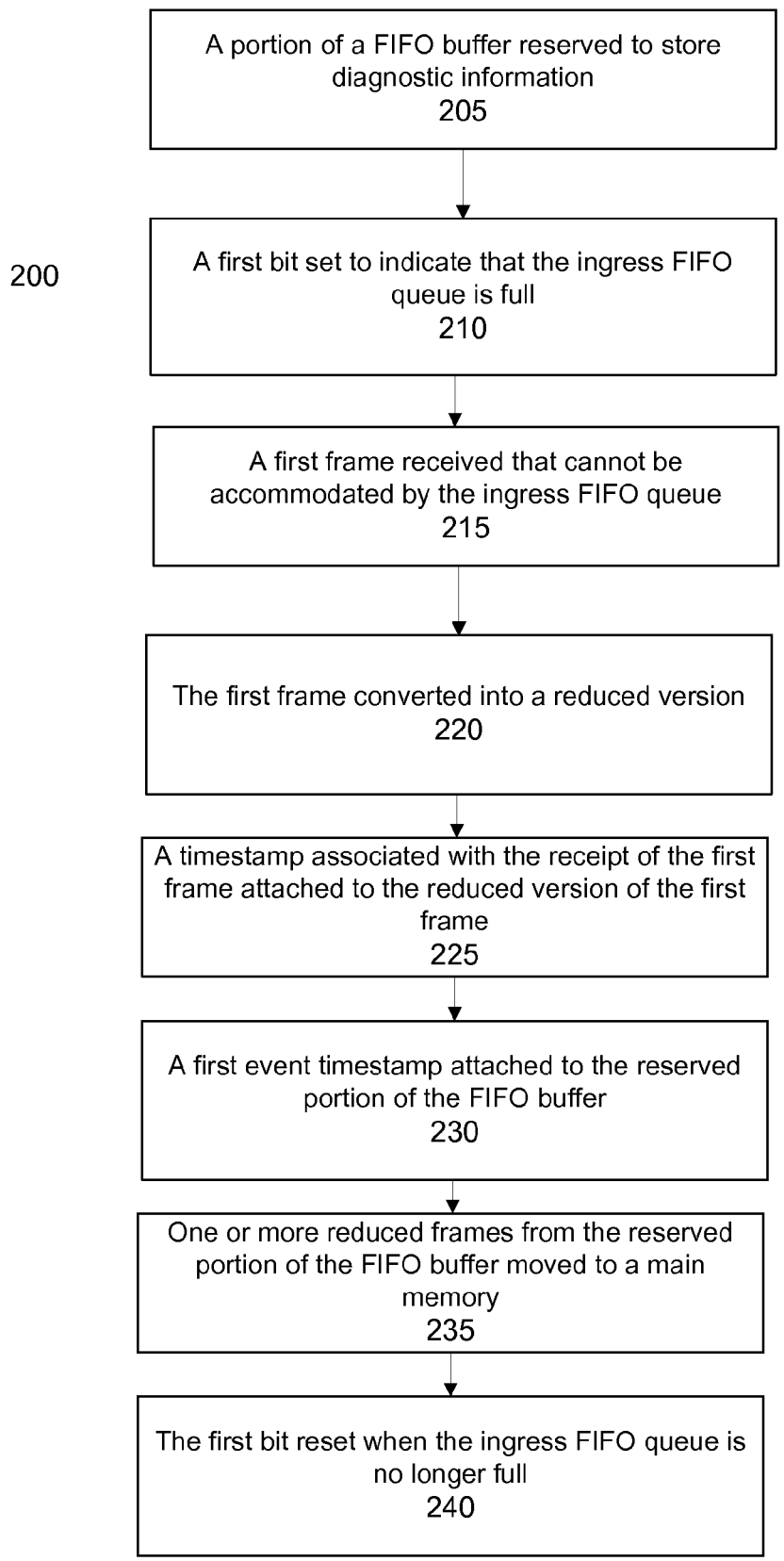
FIG. 2 is a flow chart illustrating embodiments of this disclosure.

FIG. 2 is a flow chart illustrating operation of embodiments of the present disclosure for diagnosing data microbursts. Method 200 may start at step 205 where a portion of a FIFO buffer may be reserved to store diagnostic information. Normal operation may continue until an ingress FIFO queue becomes full due to a microburst. At that point, method 200 proceeds to step 210 where a first bit may be set to indicate that the ingress FIFO queue is full.

Method 200 may proceed to step 215. At step 215, a first frame may be received that cannot be accommodated by the ingress FIFO queue. The first frame may be held at the reserved portion of the FIFO buffer. Next, at step 220, the first frame may be converted into a reduced version. In some embodiments, reducing the first frame comprises extracting a plurality of protocol fields from the first frame. In some embodiments, reducing the first frame comprises truncating the first frame to a predetermined size. The predetermined truncation size may be set as to include at least one or more protocol fields of the first frame.

Method 200 may then proceed to step 225. At step 225, a timestamp associated with the receipt of the first frame may be attached to the reduced version of the first frame. This timestamp may serve as an indicator of the start of a microburst event. After storage of a number of reduced frames, the reserved portion of the FIFO buffer may become too full to accommodate additional frames. At this stage, method 200 may proceed to step 230 where a first event timestamp may be attached to the reserved portion of the FIFO buffer. In some embodiments of the present disclosure, the number of frames that cannot be accommodated by the reserved portion of the FIFO buffer while it is full may be counted. Similarly, the average dropped frame size for the number of frames that cannot be accommodated by the reserved portion of the FIFO buffer may also be tracked.

Method 200 may proceed to step 235 where one or more reduced frames from the reserved portion of the FIFO buffer may be moved to a main memory. This not only clears the reserved area, but also allows the captured information to be shared and analyzed. In some embodiments of the present disclosure, the data from the one or more reduced frames may be transmitted to an end user, such as a technical specialist.

Finally, method 200 may proceed to step 240. At step 240, the first bit may be reset when the ingress FIFO queue is no longer full. Of course, if the ingress FIFO queue become full again, method 200 may return to step 210.

Figure 3:
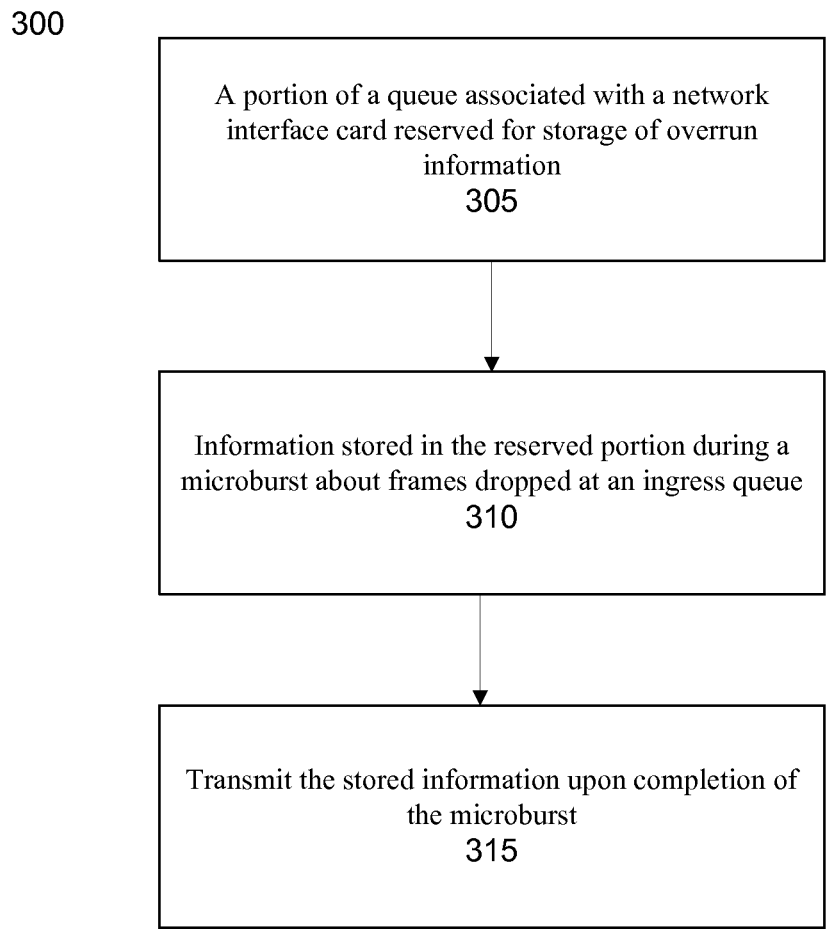
FIG. 3 is a flow chart illustrating embodiments of this disclosure.

FIG. 3 is a flow chart illustrating operation of embodiments of the present disclosure for diagnosing data microbursts. Method 300 may begin at step 305. At step 305, a portion of a queue associated with a network interface card may be reserved for storage of overrun information. In some embodiments, the reserved portion of the queue associated with a network interface card may comprise a portion of the queue which was previously reserved for future applications. Alternatively, queue space that was not pre-allotted for other uses may be employed.

Next, at step 310, information may be stored in the reserved portion during a microburst about frames dropped at an ingress queue. The stored information may comprise data from each frame and a timestamp associated with each frame. In some embodiments, each frame may be truncated to between the first forty and sixty bytes, wherein the stored information comprises the truncated frame attached to the timestamp associated with the truncated frame.

Alternatively, MAC and IP addresses may be extracted from each frame, wherein the stored information comprises the extracted MAC and IP addresses attached to the timestamp associated with the truncated frame. The MAC and IP addresses may be extracted by load-balancing functions of the network interface card. In some embodiments, the stored information may further include information about transport ports associated with each frame Method 300 may proceed to step 315 and transmit the stored information upon completion of the microburst. In some embodiments of the present disclosure the stored information may be transmitted to a CPU complex.

Figure 4:
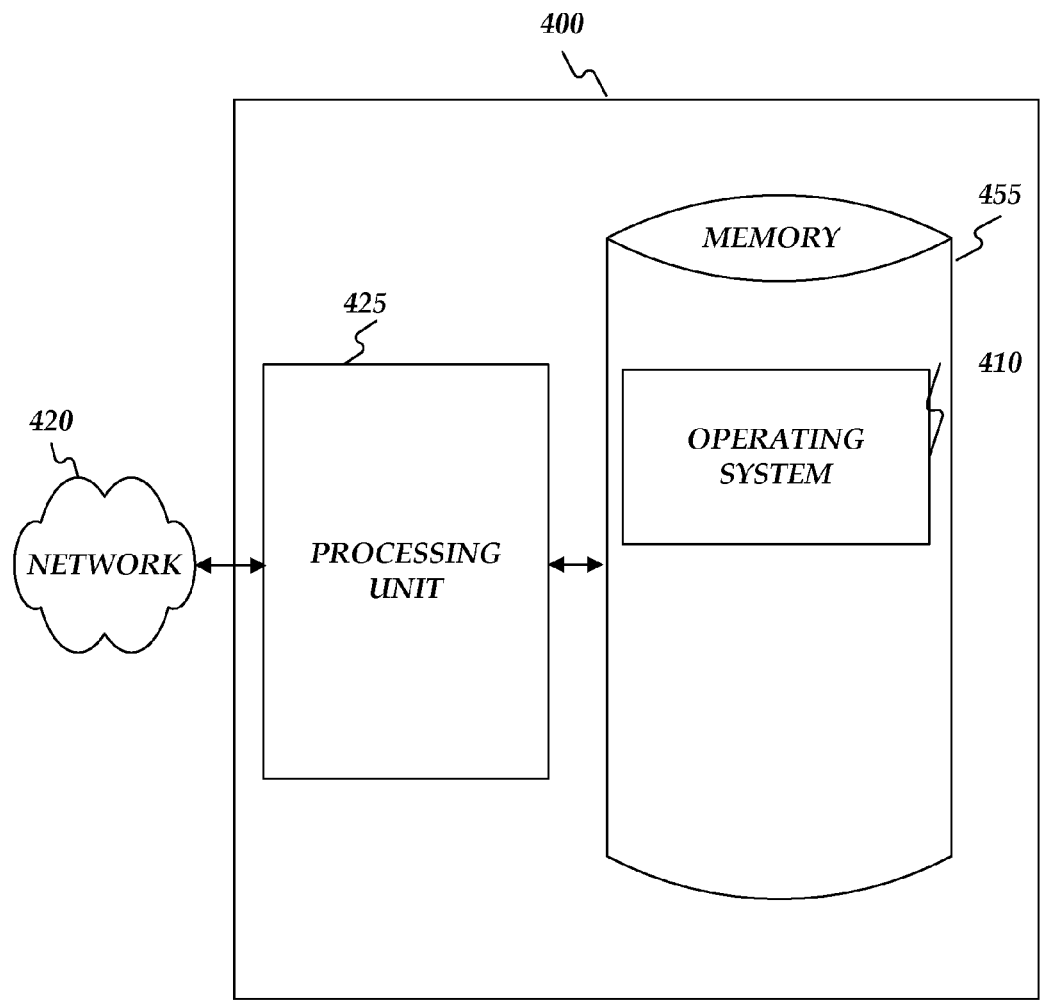
FIG. 4 is a block diagram of a computing network device.

FIG. 4 illustrates a computing device 400, such as a server, host, or other network devices described in the present specification. Computing device 400 may include processing unit 425 and memory 455. Memory 455 may include software configured to execute application modules such as an operating system 410. Computing device 400 may execute, for example, one or more stages included in the methods as described above. Moreover, any one or more of the stages included in the above describe methods may be performed on any element shown in FIG. 4.

Computing device 400 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method of diagnosing data microbursts comprising:
reserving a portion of a first memory;
setting a first bit when an ingress FIFO queue is full;
receiving a first frame that cannot be accommodated by the ingress FIFO queue;
storing a reduced version of the first frame in the reserved portion of the first memory;
attaching a timestamp associated with the receipt of the first frame to the reduced version of the first frame; and
queueing a timestamped event in the ingress FIFO queue indicating the end of a microburst, when the ingress FIFO queue is no longer full.

2. The method of claim 1, wherein reducing the first frame comprises: extracting a plurality of protocol fields from the first frame.

3. The method of claim 1, wherein reducing the first frame comprises: truncating the first frame to a predetermined size.

4. The method of claim 3, wherein the predetermined truncation size includes at least one or more protocol fields of the first frame.

5. The method of claim 1, further comprising: attaching a first event timestamp to the reserved portion of the first memory when the reserved portion of the first memory is too full to accommodate additional frames, wherein the first memory is a FIFO buffer.

6. The method of claim 5, further comprising: counting a number of frames that cannot be accommodated by the reserved portion of the FIFO buffer.

7. The method of claim 6, further comprising: tracking the average dropped frame size for the number of frames that cannot be accommodated by the reserved portion of the FIFO buffer.

8. The method of claim 5, further comprising: moving one or more reduced frames from the reserved portion of the FIFO buffer to a main memory; transmitting data from the one or more reduced frames to an end user.

9. The method of claim 8 further comprising: resetting the first bit when the ingress FIFO queue is no longer full.

10. A method of diagnosing data microbursts comprising:
reserving a portion of a queue associated with a network interface card;
storing information during a microburst about frames dropped at an ingress queue in the reserved portion, wherein the stored information comprises data from each frame and a timestamp associated with each frame;
queueing a timestamped event in the ingress queue indicating the end of the microburst, when the ingress FIFO queue is no longer full; and
transmitting the stored information upon completion of the microburst.

11. The method of claim 10 further comprising: transmitting the stored information to a CPU complex.

12. The method of claim 10, wherein the reserved portion of the queue associated with the network interface card comprises a portion of the queue reserved for future applications.

13. The method of claim 10, wherein the reserved portion of the queue associated with a network interface card comprises a portion of the queue which was not previously reserved.

14. The method of claim 10 further comprising: truncating each frame, wherein the stored information comprises the truncated frame attached to the timestamp associated with the truncated frame.

15. The method of claim 10 further comprising: extracting MAC and IP addresses from each frame, wherein the stored information comprises the extracted MAC and IP addresses attached to the timestamp associated with the truncated frame.

16. The method of claim 15, wherein the stored information further comprises information identifying transport ports associated with each frame.

17. The method of claim 15, wherein the MAC and IP addresses are extracted by load-balancing functions of the network interface card.

18. A network device comprising:
a FIFO buffer;
a network interface card; and
a memory containing executable instructions for causing a processor to perform operations comprising:
reserving a portion of the FIFO buffer; setting a first bit when an ingress FIFO queue is full; receiving a first frame that cannot be accommodated by the ingress FIFO queue;
storing a reduced version of the first frame in the reserved portion of the FIFO buffer;
attaching a timestamp associated with the receipt of the first frame to the reduced version of the first frame;
moving one or more reduced frames from the reserved portion of the FIFO buffer to the memory;
transmitting data from the one or more reduced frames to an end user; and
queueing a timestamped event in the reserved portion of the FIFO buffer indicating the end of the microburst, when the FIFO buffer is no longer full.

19. The network device of claim 18, the memory further comprising executable instructions for causing a processor to perform operations for: identifying the frequency and duration of one or more microbursts based on the transmitted data.

20. The network device of claim 19, the memory further comprising executable instructions for causing a processor to perform operations for: analyzing the reduced frames for time-based metrics.

* * * * *